United States Patent [19]
Noel

[11] 4,451,859
[45] May 29, 1984

[54] MAGNETIC VIDEO HEAD POSITION CONTROL

[75] Inventor: Stan L. Noel, Belmont, Calif.

[73] Assignee: Ampex Corporation, Redwood City, Calif.

[21] Appl. No.: 364,736

[22] Filed: Apr. 2, 1982

[51] Int. Cl.³ .......................... G11B 5/52; G11B 21/00
[52] U.S. Cl. ........................................ 360/75; 360/109
[58] Field of Search ............................ 360/75, 76, 109

[56] References Cited

U.S. PATENT DOCUMENTS

| | | | |
|---|---|---|---|
| 3,614,579 | 10/1971 | Fulton | 360/75 |
| 4,165,521 | 8/1979 | Watanabe | 360/10 |
| 4,169,276 | 9/1979 | Rodal | 360/77 |
| 4,172,265 | 10/1979 | Sakamoto et al. | 360/70 |
| 4,203,140 | 5/1980 | Watanabe | 360/77 |
| 4,223,358 | 9/1980 | Kubota et al. | 360/75 |
| 4,395,741 | 7/1983 | Kobayashi et al. | 360/77 |

FOREIGN PATENT DOCUMENTS

| | | | |
|---|---|---|---|
| 53-85411 | 7/1978 | Japan | 360/75 |
| 56-140523 | 2/1981 | Japan | 360/75 |

Primary Examiner—George G. Stellar
Attorney, Agent, or Firm—Joel D. Talcott; Harry G. Thibault

[57] ABSTRACT

A positionable magnetic head may be used in the record mode to produce video tape recordings in industry standard moving record-moving head format. In the record mode a constant control potential is applied to the positionable magnetic head so that is position is held fixed and the applied voltage is continuously monitored. Should the applied voltage vary from a permissible level a warning indication of a possible non-standard recording condition is produced or a feedback control system corrects the applied voltage. A separate fixed record head is no longer required since the reproduce head may now be used for the record head also.

17 Claims, 4 Drawing Figures

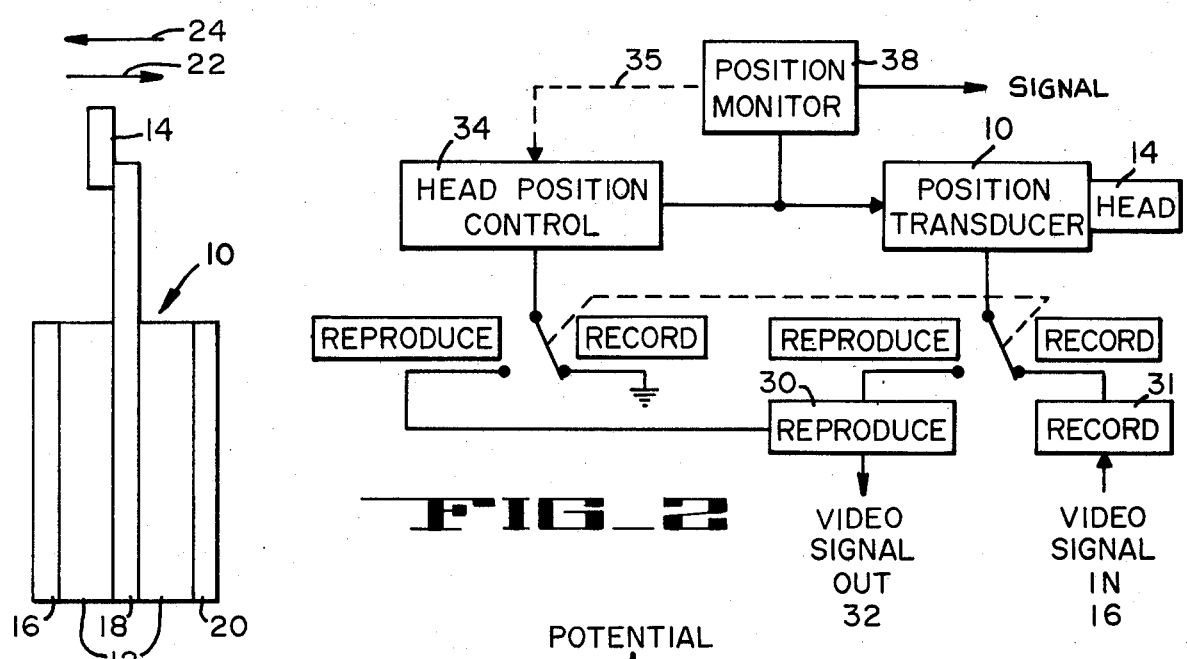
FIG_1
FIG_2
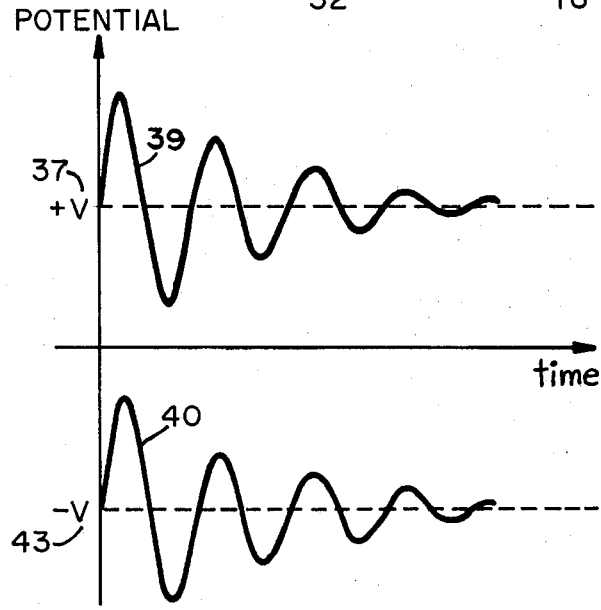
FIG_3
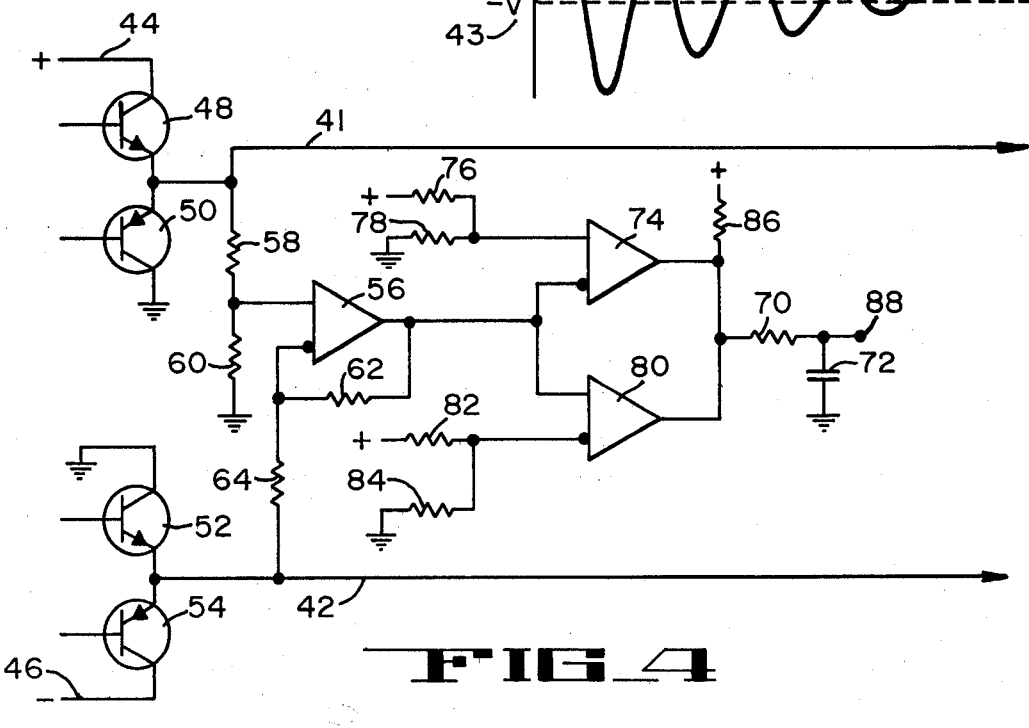
FIG_4

MAGNETIC VIDEO HEAD POSITION CONTROL

BACKGROUND OF INVENTION

This invention relates to positionable transducers, and more particularly to a system for rigidly controlling and monitoring the position of a positionable magnetic head used in a recording mode in a video recorder.

Many formats exist for recording information onto a magnetic medium, such as magnetic tape. While audio information is most often recorded in a continuous track in the direction of tape motion, known as longitudinal recording, video information is generally recorded in a series of parallel segments oriented in a direction across the width of the tape. Depending upon the format used, the video information may be recorded in a number of different configurations.

In the quadruplex format, the video information is recorded in a series of parallel tracks across the width of the tape. This is accomplished by having the record and reproduce heads mounted on a circular surface which rotates at a relatively high angular speed in a plane perpendicular to the surface of the tape. The rotating circular surface may have several record and reproduce heads mounted on it depending upon the results desired, with four heads being preferred.

In the helical scan format, the video information is recorded in a series of parallel tracks which cut across the width of the tape at an oblique angle to the direction of tape motion. This is accomplished by having the record and reproduce heads mounted on a circular structure which is rotated at relatively high angular speed. The tape is then brought in close proximity to a portion of the circumference of the rotating circular structure in a helical orientation.

In the arcuate format, the video information is recorded in a series of parallel tracks recorded across the width of the tape in the path of an arc. This is accomplished by having the record and reproduce heads mounted on a circular structure which rotates in a plane parallel to the direction of tape motion.

While there are a number of different formats, there are two characteristics which are common to all of the described formats. The first is that continuous video information is recorded in a series of discreet segments across the width of the tape. The second is that the segments are generally parallel to one another.

It will also be recalled that a television picture is composed of a number of essentially horizontal lines which are displayed across a television picture tube. The total number of horizontal lines required for a complete television picture varies according to different standards. Generally, though, the complete picture is composed of a group of two sets of vertically displayed horizontal lines, referred to as fields, which are interleaved on the picture tube to form a complete picture, referred to as a frame. In the recording of video information in conformance with the described formats, each field is recorded as a single and discreet track across the width of the magnetic tape. On the playback of a tape on which video information has been recorded, as each individual track is "read" by the reproduce head, a complete field of video information is produced.

With the video information stored as a series of segmented parallel tracks, with each track containing the video information for one field, a number of significant advantages have resulted from developments permitting the physical movement of the reproduce head, such as illustrated in U.S. Pat. No. 4,163,993, entitled Continuous Slow Motion Automatic Tracking System issued on Aug. 7, 1979 in the name of Raymond F. Ravizza.

First, due to the rather complex nature of the recorded format, a moveable reproduce head allows an automatic tracking system incorporating sensing of the signal derived from the tape by the head, with feedback to correct any misposition of the head. This results in a feedback control system for keeping the moveable reproducing head "on track", even at playback speeds differing from the record speed. This is fully described in U.S. Pat. No. 4,151,570, entitled Automatic Scan Tracking Using A Magnetic Head Supported by a Piezoelectric Bender Element, issued on Apr. 24, 1979 in the names of Raymond F. Ravizza and James R. Wheeler.

Second, by the appropriate movement of the reproduce head, a number of special effects may be obtained. For example, when the magnetic tape is in a stopped, fixed position, it is possible, by moving the reproduce head in an appropriate fashion, to read adjacent tracks containing both interlaced fields of a video frame in a repeating sequence, thus generating a complete "still" picture.

While there are several ways in which to produce the actual moveable structure on which a magnetic head is mounted, one particularly effective method has involved the application of a potential with a predetermined waveform across piezoelectric material, thereby effecting physical movement, as more fully described in U.S. Pat. No. 4,151,569, entitled Positionable Transducer Mounting Structure Using A Piezoelectric Bender Element issued on Apr. 24, 1979, in the name of Richard A. Hathaway, which patent is hereby expressly incorporated by reference.

Nothwithstanding the complexity of the process of recording a video signal onto a magnetic tape, there exists the practical necessity of interchangeability of recorded tapes, whereby a tape produced by one machine must be playable on different machines, even machines built by different manufacturers. Accordingly, detailed standards have been established for each of the various recording formats. From a practical standpoint, even after the advent of the moveable playback head, it has been generally felt that video recording must be accomplished with a fixed head to ensure compliance with the various standards; otherwise, any motion of the record head, while recording, would produce a non-standard recording. Such a non-standard recording could not thereafter be played back at normal speed without the use of a moveable reproduce head to follow the track variations resulting from the undesirable physical movement of the record head while it was recording.

Consequently, video recorders generally require the presence of at least three heads: a fixed erase head, a fixed record head, and a reproduce head, which may be either fixed or moveable.

However, from an economic standpoint, reducing the number of heads in a video recorder would have clear advantages, as would be possible if the reproduce head could be used as a record head. This is, of course, possible in recorders using fixed heads for both recording and reproduction. However, moveable record heads are generally not found in video recorders used in professional applications due to the possibility of producing a non-standard recording resulting from the movement of the record head during the recording process.

SUMMARY OF INVENTION

It is an object of the present invention to allow the use of a moveable reproduce head as a record head. It is also an object of the present invention to allow the use of a moveable reproduce head as a record head to produce a standard recording.

It is a further object of the present invention to allow the use of a moveable reproduce head as a record head to produce a standard recording by rigidly positioning the moveable head in a fixed position by application of an appropriate control voltage, and thereafter continuously monitoring the control voltage so applied.

It is a yet further object of the present invention to continuously monitor the control voltage applied to the moveable head and provide indication when the control voltage is outside of a permissible range.

In accordance with the present invention, a moveable video head mounted on a positionable transducer is used as a recording head as well as a reproduce head. In the recording mode, a fixed voltage corresponding to the desired fixed position of the head is applied. The applied voltage is continuously monitored as an indication of head position. Should the applied voltage vary from the desired voltage by an amount sufficient to physically move the head outside the range permitted by the recording standard, an output is generated which may be used either in a feedback control system to effect correction of the applied voltage and hence correct the position of the record head, or as a warning indication of a possible non-standard recording condition.

These and other objects, features and advantages of the present invention will become apparent when reading the following description of the preferred embodiment with reference to the figures.

BRIEF DESCRIPTION OF THE DRAWINGS

FIG. 1 is a general schematic cross-section view of a device used to effect physical movement of a magnetic head mounted thereon.

FIG. 2 is a schematic diagram of a head positioning control in accordance with the present invention.

FIG. 3 illustrates a decaying oscillatory waveforms applied to the position transducer to effect the mechanical centering of the position transducer.

FIG. 4 illustrates a preferred position monitor circuit for use in the head position control of FIG. 2.

DETAILED DESCRIPTION OF PREFERRED EMBODIMENT

Referring now to FIG. 1, a side view of transducer 10 employing piezoelectric material 12 which is subjected to a predetermined potential waveform for affecting physical displacement of a magnetic head 14 mounted thereon is illustrated. The transducer operates in the following manner. Piezoelectric material 12 which is preferably a piezoelectric ceramic material as used in piezoelectric ceramic bender element either manufactured by Vernitron Corp. and identified as PZT-5HN Bender Bi-Morph Poled For Parallel Operation or by Gulton Industries and identified as G 1278 Piezoelectric Bender Element Poled For Parallel Operation, is placed between electrodes 16, 18 and 20. Assuming a particular orientation of the piezoelectric material, by application of a potential difference with reference to electrode 18, which is usually at ground potential, such that electrode 20 is more positive than electrode 18, and electrode 16 is less positive than electrode 18, a bending or displacement results, with magnetic head 14 being displaced in the direction of arrow 22. Assuming the same orientation of the piezoelectric material as heretofore, and reversing the polarity of the potentials applied, i.e., by application of a potential difference with reference to electrode 18 such that electrode 16 is more positive than electrode 18 and electrode 20 is less positive than electrode 18, magnetic head 14 is displaced in the direction of arrow 24. Details on the structure and operation of the transducer may be seen in the aforementioned U.S. Pat. No. 4,151,569.

FIG. 2 illustrates the basic arrangement wherein the same magnetic head is used in both the play and record modes. Head 14 is mounted on position transducer 10, and in the reproduce mode, supplies an output signal to the reproduce electronics 30 from which a video signal 32 is generated. In accordance with the feedback position control system previously referenced, the reproduce electronics 30 provide a varying control signal to head position control 34 which in turn supplies the appropriate control voltage to position transducer 10 to effect correct position of head 14 to the desired track of the magnetic tape.

In the record mode, the same magnetic head 14 is used to effect the recording of the signal produced by record electronics 31 responsive to the input video signal 16. As the position transducer illustrated in FIG. 1 exhibits a mechanical hysteresis and consequently will not always return to the exact same physical location each time the potential applied to the electrodes thereof is removed, it is necessary to pre-position the position transducer 10 to an electrical balanced position corresponding to the position assumed in response to the application of a constant potential to the electrodes thereof. This is accomplished by the application of a decaying oscillatory voltage waveform which decays to the desired constant potential to be applied to the position transducer in the record mode, as illustrated in FIG. 3.

Referring to FIG. 3, a positive decaying oscillatory waveform 39 is applied to one electrode, 16 or 20, of position transducer 10, and a negative decaying oscillatory waveform 40 is applied to the other electrode. The effect of the application of these voltage waveforms is to effect alternating decreasing positional displacement of positional transducer 10 to a final fixed position defined by the magnitude of the positive and negative potentials supplied to the respective electrodes. Thereafter, the constant positive +V 37, and negative potential −V 43, to which these decaying oscillatory waveforms decay, are maintained on the electrodes of the position transducer. As a result, the position transducer 10 and consequently the magnetic head 14 will be mechanically biased by approximately equal amounts in both directions and will therefore remain rigidly fixed in position.

To assure that recordings made in this manner will always be within desired tolerance, a position monitoring circuit 38 (FIG. 2) is provided. The potentials supplied to electrodes 16 and 20 with reference to electrode 18 by head position control 34 are monitored by the position monitor 38. In the position monitor circuit 38, the applied potentials are compared with predefined values to assure that the magnitudes of these potentials are within a preselected range which maintains the head within an acceptable position range for the production of recordings in accordance with required standards.

A preferred position monitoring circuit is illustrated FIG. 4. The potentials 41 and 42 supplied to electrodes 16 and 18 of position transducer 10 are derived from the positive supply voltage 44 as controlled by transistors 48 and 50 and the negative supply voltage 46, as controlled by transistors 52 and 54 operating in complementary symmetry. These transistors comprise a portion of the head position control 34 (FIG. 2) which produces signals with the necessary characteristics to drive the the positionable transducer 10 in both the record and reproduce modes, as previously described. During the reproduce mode, potentials 41 and 42 are the necessary control signals which keep the head in the desired physical relation with respect to the track on the magnetic tape which is being "read". During the record mode, the potentials 41 and 42 are constant, having decayed to the desired constant potential value from an oscillatory state, and of the proper amount to position the head in the desired location for the production of a standard recording.

An operational amplifier 56, in conjunction with resistors 58, 60, 62 and 64 comprise a differential input amplifier. The differential input amplifier serves to produce a signal which is representative of the difference in potential supplied to electrodes 16 and 20 (FIG. 1) of the position transducer. Voltage 41 is applied to one input of the differential input amplifier through a voltage divider network formed of resistors 58 and 60. Voltage 42 is applied to the other input of the differential input amplifier through resistor 64. Resistor 62 functions as a feedback resistor.

One voltage comparator comprises operational amplifier 74. Resistors 76 and 78 form a voltage divider network which defines a reference voltage which represents the maximum acceptable upper limit on the value of the voltage from the differential input amplifier 56. This value is directly proportional to the displacement of head 14 mounted on position transducer 10 and thus represents the maximum acceptable displacement of head 14 by position transducer 10 in one direction. The output of the differential input amplifier is applied to the inverting input of operational amplifier 74. From this configuration it is observed that the output of operational amplifier 74 will be in a high state as long as the output voltage from the differential input amplifier is less than the voltage level defined by resistive network composed of resistors 76 and 78. If the output of the differential input amplifier should exceed this voltage level, the output of comparator 74 would change to its low state, thereby indicating that the potential supplied to position transducer 10 is outside of the acceptable range.

Operational amplifier 80 is configured to function as a comparator in a similar manner. The resistive network composed of resistors 82 and 84 serve to define a second voltage level, which represents the lower limit on the value of the voltage from the differential input amplifier which is acceptable. This value is directly proportional to the displacement of head 14 in the opposite direction from that referenced in connection with comparator 74. This value is supplied to the inverting input of operational amplifier 80. The output of the differential input amplifier is supplied to the non-inverting input of operational amplifier 80. From this configuration it will be observed that the output of operational amplifier 80 will remain in its high state as long as the output from the differential input amplifier is greater than the potential defined by the resistive network composed of resistors 82 and 84. The output of comparator 80 will change to its low state if the output from the differential input amplifier falls below the voltage level defined by the resistive network composed of resistors 82 and 84, thereby indicating that the potential supplied to position transducer 10 is outside of the acceptable range.

The output of operational amplifiers 74 and 80 configured as comparators are connected together to a common resistor 86 in a WIRED-OR arrangement. Consequently, the output from the two comparators 88 will remain in a high state as long as the output from the differential input amplifier remains greater than the potential defined by resistive network 82 and 84, and less than the potential defined by resistive network 76 and 78. Should the output of the differential input amplifier fall outside of these two voltage limits, the output 88 will change from a high to a low state.

The WIRED-OR output of the two comparators is then fed to a low pass filter composed of resistor 70 and capacitor 72, which functions to remove any signal changes on the outputs of said comparators resulting from noise.

Recalling that the presence of a difference in potential between the voltage supplied to position transducer 10 electrode 20 and the voltage supplied to position transducer 10 electrode 16 results in movement, it is thus observed that the potentials used to affect head motion are continuously monitored by the present invention, with an indication being generated when a potential which would result in significant head movement is present.

While the foregoing has described application of the present invention in a specific circuit configuration, same is not intended to limit the application of the invention to a particular embodiment. For example, the control potentials supplied to the position transducer could be monitored in a different fashion than that described in the preferred embodiment herein to act in a feedback control system which, in response to the presence of a potential outside of the acceptable range, would result in a feedback signal 35 to Head Position Control 34. (FIG. 2) to effect the necessary correction of the potentials supplied to the position transducer. These and other modifications and variations would be apparent to one skilled in the art, and are encompassed herein, as further defined by the claims.

What is claimed:

1. Apparatus for controlling the position of a positionable magnetic head, said apparatus comprising:
   a positionable magnetic head;
   means for applying a constant potential to said positionable magnetic head so that the positionable magnetic head is rigidly held in a fixed position;
   means for comparing said constant potential with a predefined voltage; and,
   means for producing an output if said constant potential differs from said predefined voltage.

2. Apparatus as defined in claim 1, wherein said means for producing an output further comprises means for signaling said constant potential differs from said predefined voltage.

3. Apparatus as defined in claim 1, wherein said means for producing an output further comprises means responsive to a difference between said constant potential and said predefined voltage, for adjusting said constant potential to a value equal to said predefined voltage.

4. Apparatus as defined in claim 1, wherein said means for producing an output further comprises means responsive to a difference between said constant potential and said predefined voltage, for adjusting said constant potential toward said predefined voltage.

5. Apparatus as recited in claim 1 wherein the means for comparing comprises a first and a second comparator each having a first and a second input producing a first output when the potential of the first input is greater than the potential of the second input, and a second output when the potential of the first input is less than the potential of the second input, with the said constant potential supplied to the first input of said first comparator and the second input of said second comparator, and said predefined voltage applied to the second input of said first comparator and the first input of said second comparator.

6. Apparatus as defined in claims 1, 2 or 5 further comprising low pass filter means for removing high frequencies from said output.

7. Apparatus for fixing the position of a positionable magnetic head responsive to a first and a second potential, and monitoring the position thereof by comparison with a first and a second predefined voltage, said apparatus comprising:
a positionable magnetic head;
means for applying a first and a second constant potential to the positionable magnetic head so that the positionable magnetic head is rigidly held in a fixed position;
means for determining the difference between the first and the second potential;
means for comparing said difference with the first and the second predefined voltage;
means for signaling if said difference is greater than said first predefined voltage; and,
means for signaling if said difference is less than said second predefined voltage.

8. Apparatus as recited in claim 7 wherein said positionable magnetic head comprises a magnetic head mounted on a piezoelectric bender element formed of two piezoelectric ceramic plates bonded to an intervening substrate and sandwiched between two electrodes, for effecting position of said magnetic head in response to said first and second potential.

9. Apparatus as recited in claim 7 wherein said positionable magnetic head comprises:
a magnetic head mounted on a thin leaf element that is pivotably mounted on a support element; and,
electromagnetic means positioned adjacent to said leaf element for producing magnetic fields for pivotal movement of said leaf in response to said first and second potential.

10. Apparatus as recited in claim 7 wherein the means for comparing said differences comprises
a first comparator having a first and a second input producing a first output when the potential of the first input is greater than the potential of the second input, and a second output when the potential of the first input is less than the potential of the second input, with the difference between the first and the second predefined voltage being supplied to the first input and the first predefined voltage being supplied to the second input;
a second comparator having a first and a second input producing a first output when the potential of the first input is greater than the potential of the second input, and a second output when the potential of the first input is less than the potential of the second input, with the difference between the first and the second predefined voltage being supplied to the second input and the second predefined voltage being supplied to the first input.

11. Apparatus for controlling the position of a positionable magnetic head, and monitoring the position thereof by comparison with a first and a second predefined voltage, said apparatus comprising:
a positionable magnetic head;
means for applying a first and a second constant potential to said positionable magnetic head so that the positionable magnetic head is rigidly held in a fixed position;
means for determining the difference between the first and the second potential; and
means for correcting said constant potential responsive to said difference so that said constant potential is less than said first predefined voltage and greater than said second predefined voltage.

12. Apparatus as recited in claim 7 or 11 wherein the means for determining the difference comprises a differential input amplifier having a first and a second input and producing an output equal to the difference between the first and the second input, with the first constant potential being supplied to the first input and the second constant potential being supplied to the second input.

13. Apparatus as described in claims 1, 7, or 11 further comprising means for effecting alternating monotically decreasing positional displacement of said positionable magnetic head about a predefined quiescent position.

14. A method to rigidly fix a moveable magnetic head in position and to monitor that position, wherein a predefined voltage represents a positional limit beyond which it is not acceptable for the magnetic head to move, comprising:
applying a constant potential to the moveable magnetic head whose position is controlled thereby;
comparing the potential with the predefined voltage;
signaling if the constant potential differs from the predefined voltage.

15. A method as recited in claim 14 wherein said signaling comprises adjusting said constant potential so that said potential is equal to said predefined voltage.

16. A method for controlling a moveable magnetic head wherein a first and a second predefined voltage represent positional limits beyond which it is not acceptble for the magnetic head to move, comprising:
applying a first and a second constant potential to the moveable magnetic head whose position is controlled thereby;
determining the difference between the first potential and the potential;
comparing said difference with the first and second predefined voltage;
signaling if said difference is greater than said first predefined voltage; and,
signaling if said difference is less than said second predefined voltage.

17. A method as recited in claim 16 wherein said signaling comprises adjusting said first and second potential such that said difference is less than said first predefined voltage and said difference is greater than said second predefined voltage.

* * * * *

UNITED STATES PATENT AND TRADEMARK OFFICE
CERTIFICATE OF CORRECTION

PATENT NO. : 4,451,859

DATED : May 29, 1984

INVENTOR(S) : Stan L. Noel

It is certified that error appears in the above-identified patent and that said Letters Patent is hereby corrected as shown below:

Column 8, line 51, correct the spelling of "acceptble" to --acceptable--;

Column 8, line 56, between "the" and "potential" insert --second--.

Signed and Sealed this

Seventeenth Day of September 1985

[SEAL]

Attest:

Attesting Officer

DONALD J. QUIGG

Commissioner of Patents and Trademarks—Designate